US012640560B2

(12) United States Patent
Lin et al.

(10) Patent No.: US 12,640,560 B2
(45) Date of Patent: May 26, 2026

(54) CONTROL DEVICE, ENERGY MANAGEMENT SYSTEM, AND NON-TRANSITORY COMPUTER READABLE MEDIUM

(71) Applicant: KABUSHIKI KAISHA TOSHIBA, Tokyo (JP)

(72) Inventors: Qiang Lin, Kawaguchi (JP); Tetsu Shijo, Tokyo (JP); Yasuhiro Kanekiyo, Yokohama (JP); Kenichiro Ogawa, Yokohama (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 0 days.

(21) Appl. No.: 18/671,170

(22) Filed: May 22, 2024

(65) Prior Publication Data

US 2025/0096567 A1 Mar. 20, 2025

(30) Foreign Application Priority Data

Sep. 15, 2023 (JP) ................................. 2023-150537

(51) Int. Cl.
*H02J 3/24* (2006.01)
*H02J 3/32* (2006.01)
*H02J 3/38* (2006.01)

(52) U.S. Cl.
CPC ................ *H02J 3/241* (2020.01); *H02J 3/32* (2013.01); *H02J 3/381* (2013.01); *H02J 2203/10* (2020.01)

(58) Field of Classification Search
CPC .... H02J 3/241; H02J 3/32; H02J 3/381; H02J 2203/10; H02J 3/24; H02J 3/38

USPC .......................................................... 307/43
See application file for complete search history.

(56) References Cited

U.S. PATENT DOCUMENTS

| | | | |
|---|---|---|---|
| 8,140,194 | B2 | 3/2012 | Iino et al. |
| 8,862,281 | B2 | 10/2014 | Yoneda et al. |
| 9,671,807 | B2 | 6/2017 | Namba et al. |
| 11,658,478 | B2 | 5/2023 | Yin |

(Continued)

FOREIGN PATENT DOCUMENTS

| | | |
|---|---|---|
| CN | 116054139 A | 5/2023 |
| JP | S5015295 B1 | 6/1975 |

(Continued)

OTHER PUBLICATIONS

Japanese Office Action (and an English language translation thereof) dated Jan. 23, 2026, issued in corresponding Japanese Application No. 2023-150537.

*Primary Examiner* — Elim Ortiz
*Assistant Examiner* — Xuan Ly
(74) *Attorney, Agent, or Firm* — Holtz, Holtz & Volek PC

(57) ABSTRACT

According to one embodiment, a control device for an electric power system capable of supplying power to load devices in a plurality of demand areas based on first to N-th power devices in first to N-th placement areas and configured to be able to perform at least one of discharge or charge of power, comprising: a controller configured to detect, based on information of power consumption in each of the demand areas, a demand area in which the power consumption fluctuates more significantly than usual, and determine, according to distances between a detected demand area and the first to N-th placement areas, a control parameter related to input and output of power in the first to N-th power devices.

12 Claims, 5 Drawing Sheets

(56)  References Cited

U.S. PATENT DOCUMENTS

2014/0365027 A1 * 12/2014 Namba ..................... G05F 1/66
                                                700/297
2023/0006442 A1    1/2023 Kudo
2024/0322555 A1 *  9/2024 Sun .......................... H02H 7/22

FOREIGN PATENT DOCUMENTS

| | | |
|---|---|---|
| JP | S5396439 A | 8/1978 |
| JP | 2010178468 A | 8/2010 |
| JP | 2011083086 A | 4/2011 |
| JP | 2013258806 A | 12/2013 |
| JP | 2020010590 A | 1/2020 |
| JP | 2020043660 A | 3/2020 |
| JP | 2020078162 A | 5/2020 |
| JP | 6735039 B1 | 8/2020 |
| WO | 2012124370 A1 | 9/2012 |
| WO | 2013103011 A1 | 7/2013 |
| WO | 2021131576 A1 | 7/2021 |

* cited by examiner

CONTROL DEVICE, ENERGY MANAGEMENT SYSTEM, AND NON-TRANSITORY COMPUTER READABLE MEDIUM

CROSS REFERENCE TO RELATED APPLICATIONS

This application is based upon and claims the benefit of priority from the prior Japanese Patent Application No. 2023-150537, filed on Sep. 15, 2023, the entire contents of which are incorporated herein by reference.

FIELD

The present embodiment relates to a control device, an energy management system, and a non-transitory computer readable medium.

BACKGROUND

A power transmission loss occurs while electricity generated in a power plant is transmitted to a region where the electricity is to be actually used. The power transmission loss is a power loss which occurs because, when a current flows through a line, part of the electricity turns into heat to be escaped into the air due to a resistance of the line or the like. To reduce the power loss due to the power transmission loss, local generation for local use of electricity has attracted attention. According to the local generation for local use, since electricity generated in a local area (microgrid) is locally used, the distance of the power transmission is shortened, and the power transmission loss can be diminished. A technology related to the local generation for local use includes a system for the local generation for local use of power with which power derived from renewable energy which is generated in a region can be efficiently used in the region.

However, in this system, although the power transmission loss can be reduced by the local generation for local use, a devisal aimed to reduce the power transmission loss in the microgrid is not taken into account. For example, even in the microgrid, when the distance from a power generation source (power supply source) to a supply destination area is long, the power transmission loss is relatively increased, but a devisal aimed to reduce such a power transmission loss has not been disclosed.

DETAILED DESCRIPTION

According to one embodiment, a control device for an electric power system capable of supplying power to load devices in a plurality of demand areas based on first to N-th power devices in first to N-th placement areas and configured to be able to perform at least one of discharge or charge of power, comprising: a controller configured to detect, based on information of power consumption in each of the demand areas, a demand area in which the power consumption fluctuates more significantly than usual, and determine, according to distances between a detected demand area and the first to N-th placement areas, a control parameter related to input and output of power in the first to N-th power devices.

Hereinafter, embodiments of the present invention will be described in detail with reference to the drawings.

First Embodiment

Figure 1:
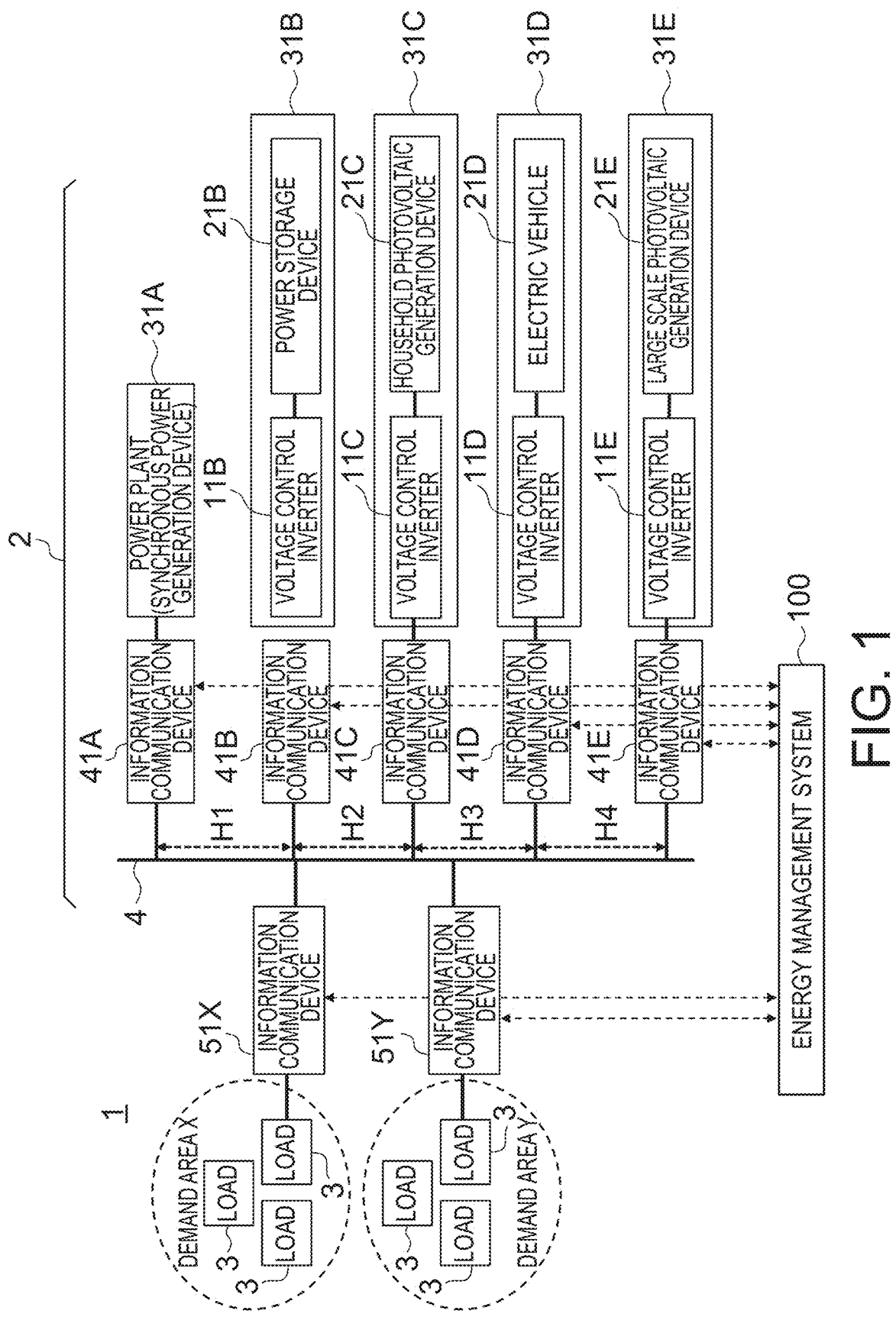
FIG. 1 is a block diagram illustrating an example of an overall view of an electric power system 1 according to a first embodiment.

FIG. 1 is a block diagram illustrating an example of an overall view of an electric power system 1 according to a first embodiment. A straight and solid line which connects components of the electric power system 1 represents an electric connection, and a straight and broken line represents a communication connection.

The electric power system 1 is a system configured to supply power which is generated or stored in a power system 2 (power source side) to each of load devices 3 (consumers) in a supply destination area on a demand side. In the electric power system 1, even when a balance between the generated power and power consumption by the consumers changes, a frequency of the power system 2 suppresses fluctuation, and frequency control for stabilizing the frequency is efficiently achieved.

The supply destination area is divided into a plurality of demand areas in an overall map covered by an energy management system 100, and a demand area X and a demand area Y are exemplified in FIG. 1 among the demand areas. One or more load devices 3 each of which consumes power are arranged in the demand area X and the demand area Y. The load device 3 is specifically a consumer which consumes power. The load device 3 may be household electric appliance in an office or a house, may be industrial appliance in a plant, may be a device including a storage battery such as an EV, or may be other devices. A smart meter configured to measure power consumption and a GPS (global positioning system) are provided in the load device 3 or the consumer. The smart meter is an example of a measurement device having a function of measuring power consumption, a communication function, or the like. The GPS is an example of a location detection device configured to detect a location of the load device 3. The load device 3 in each of the demand areas X and Y is connected to a transmission and distribution line 4 in the power system 2. A substation or the like may stand between the load device 3 and the transmission and distribution line 4. In a case where a power source of the load device 3 in the demand areas X and Y turns ON from OFF or an opposite case where the power source turns OFF from ON, a case where a new load device 3 is connected, a case where an operation of the load device 3 is changed, or the like, power consumption (power demand) in the demand areas X and Y may temporarily significantly fluctuate. In other words, the power consumption in the demand areas may fluctuate more significantly than usual.

Information communication devices 51X and 51Y are provided in the demand areas X and Y. The information communication devices 51X and 51Y can communicate with the smart meter for the load device 3 in the respective demand areas in a wireless or wired manner, and acquire information of the power consumption of the load device 3 at certain time intervals or any timing. The information communication devices 51X and 51Y calculate power consumption in the demand area (amount of power demanded in the demand area) by adding the acquired power consumption among the load devices 3 in the demand area. In addition, the information communication devices 51X and 51Y may acquire location information of the load device 3 (for example, detected location information of the GPS) together with the information of the power consumption.

The information communication devices 51X and 51Y may include a storage configured to store a history of the power consumption of the individual load device 3 and a history of total power consumption of these load devices 3 (power consumption in the demand area). The history of the power consumption of the individual load device 3 may further include location information of the individual load device 3. In addition, the history of the total power consumption (power consumption in the demand area) may include information of a representative location which is calculated from the location information of the individual load device 3. The representative location may be a weighted center of these location information, or may be one location information selected from these location information. The one location information to be selected may be location information of the load device 3 with highest power consumption, may be location information of the load device 3 with largest fluctuation of the power consumption, or may be randomly selected location information.

The information communication devices 51X and 51Y are communicable with the energy management system 100 in a wireless or wired manner. Note that the GPS may be provided in the information communication devices 51X and 51Y. When the information communication devices 51X and 51Y are in the demand area, location information of the information communication devices 51X and 51Y may be used as the location information of the demand area. The information communication devices 51X and 51Y may respectively transmit power consumption information and location information (information of the representative locations) of the demand areas X and Y to the energy management system 100 at certain time intervals or any timing. The transmission may be autonomously performed, or may be performed in response to a request from the energy management system 100.

The power system 2 is a system configured to generate power by using various power generation devices (power generation), store power by using various power storage devices, and transmit and distribute power by using a transmission and distribution line. The power system 2 may be an electrical grid configured to deal with high volume power, or may be a local system (microgrid) configured to deal with lower volume power than the backbone system. Hereinafter, the backbone system will be mainly assumed, and a case of the microgrid will be illustrated in a second embodiment.

A plurality of power source devices (power devices) 31A, 31B, 31C, 31D, and 31E are placed as dispersed power sources in the transmission and distribution line 4 in the power system 2. When these power devices are not particularly distinguished, these power devices are referred to as the power device 31. Information communication devices 41A, 41B, 41C, 41D, and 41E are provided between the plurality of respective power devices 31A to 31E and the transmission and distribution line 4. The information communication devices 41A to 41E are respectively communicable with the power devices 31A to 31E in a wired or wireless manner, and also communicable with the energy management system 100 in a wired or wireless manner. The information communication devices 41A to 41E provide the facility information, information of situations or the like of the power devices 31A to 31E to the energy management system 100. The information communication devices 41A to 41E also acquire command information from the energy management system 100, and provide the acquired command information to the power devices 31A to 31E. As an example, the command information may include information related to a control parameter which is set in the power device, or may include information related to active power and reactive power which the power device is caused to input and output. Note that in this example, the information communication devices 41A to 41E are placed between the transmission and distribution line 4 and the power devices 31A to 31E, but locations where the information communication devices 41A to 41E are placed may be other locations.

The power devices 31A to 31E are respectively placed in geographically different areas. A placement area of the power device 31A and a placement area of the power device 31B is separated by a distance H1. A placement area of the power device 31B and a placement area of the power device 31C is separated by a distance H2. A placement area of the power device 31C and a placement area of the power device 31D is separated by a distance H3. A placement area of the power device 31D and a placement area of the power device 31E is separated by a distance H4. As an example, the distances H1, H2, H3, and H4 are 200 km, 100 km, 100 km, and 200 km. The placement areas of the power devices 31A to 31E are respectively referred to as areas A to E. The distance is basically a distance along a power line of the power system 2. However, when the distance along the power line can be approximated to a geographical distance, a distance between locations (coordinates) of the placement area can also be used. The location of the placement area may be a location of the power device, an address of the area, or the like. In this example, a single power device is arranged in each of the placement areas, but a plurality of power devices may be arranged in each of the placement areas.

The distance in each of the demand areas to the areas A to E varies. For example, the demand area X is the closest to the placement area of the power device 31B, and is the second closest to the placement area of the power device 31C. Furthermore, the demand area X is the third closest to the placement area of the power device 31D and the placement area of a synchronous generator 31A to a same extent, and is the farthest to the placement area of the power device 31E. In a similar manner, the distance of the demand area Y to the areas A to E also varies. As the placement area is farther, the power line (transmission and distribution line) is further lengthened, and an attenuation of transmitted power is also further increased. In addition, a magnitude of the attenuation is further increased as a frequency component is higher. A distance between the demand area and the placement area is basically a distance along the power line of the power system 2 (which may also include a line in the demand area). However, when the distance along the power line can be approximated to a geographical distance, a distance between the location (coordinates) of the demand area and the location (coordinates) of the placement area can be used.

Hereinafter, the power devices 31A to 31E respectively placed in the areas A to E will be described in detail. The power devices 31A to 31E correspond to first to N-th (N is an integer greater than or equal to 2) power devices which are arranged in the power system and which are able to perform at least one of charge or discharge (input or output) of power.

The power device 31A is a synchronous power generation device configured to generate AC power to be output to the transmission and distribution line 4 side. The power device 31A is also referred to as a synchronous generator 31A or a synchronous power generation device 31A. The synchronous generator is provided in an electric power company, for example. Specifically, the synchronous generator is a heat power plant, a hydraulic power plant, a nuclear power plant, a geothermal power plant, or the like. An operation of the power device 31A is controlled by the command information (command value) of the energy management system 100.

The power device 31B includes a voltage control inverter 11B and a power storage device 21B connected to the voltage control inverter 11B. The power storage device 21B is a storage battery capable of charging power supplied from the transmission and distribution line 4 or discharging the charged power to the transmission and distribution line 4. An operation of the charge and discharge of the power storage device 21B is controlled by the voltage control inverter 11B. The voltage control inverter 11B is controlled by the command information of the energy management system 100. The voltage control inverter 11B operates like a voltage source. In a case of the discharge, the voltage control inverter 11B converts DC power input from the power storage device 21B into AC power to be output to the transmission and distribution line 4 side. In a case of the charge, the voltage control inverter 11B converts AC power input from the transmission and distribution line 4 into DC power to be output to the power storage device 21B. The voltage control inverter may also be referred to as power conversion device or PCS (power conditioning system).

The power device 31C includes a voltage control inverter 11C and a household photovoltaic generation device 21C connected to the voltage control inverter 11C. The household photovoltaic generation device 21C can discharge photovoltaically generated power to the transmission and distribution line 4. An operation of the household photovoltaic generation device 21C is controlled by the voltage control inverter 11C. The voltage control inverter 11C is controlled by the command information of the energy management system 100. The household photovoltaic generation device 21C may include a storage battery configured to store photovoltaically generated power. The voltage control inverter 11C operates like a voltage source, and converts DC power input from the household photovoltaic generation device 21C into AC power to output to the transmission and distribution line 4 side.

The power device 31D includes a voltage control inverter 11D and an electric vehicle 21D connected to the voltage control inverter 11D. The electric vehicle 21D includes a storage battery. The electric vehicle 21D can be connected through insertion or the like of a plug to the power system 2, and can be separated from the power system 2 through removal or the like of the plug. The electric vehicle 21D connected to the power system 2 can charge power supplied from the transmission and distribution line 4 or power supplied from an external storage (not illustrated) in an internal storage battery, or discharge the power stored in the storage battery to the transmission and distribution line 4. An operation of the electric vehicle 21D is controlled by the voltage control inverter 11D. An operation of the voltage control inverter 11D is controlled by the command information of the energy management system 100. The voltage control inverter 11D operates like a voltage source. In a case of the discharge, the voltage control inverter 11D converts DC power input from the storage battery of the electric vehicle 21D into AC power to be output to the transmission and distribution line 4 side. In a case of the charge, the voltage control inverter 11D converts AC power input from the transmission and distribution line 4 into DC power to be output to the storage battery of the electric vehicle 21D.

The power device 31E includes a voltage control inverter 11E and a large scale photovoltaic generation device 21E connected to the voltage control inverter 11E. The large scale photovoltaic generation device 21E is a photovoltaic generation device with a generation capacity (output power) larger than a generation capacity of the household photovoltaic generation device 21B. The large scale photovoltaic generation device 21E can discharge photovoltaically generated power to the transmission and distribution line 4. An operation of the large scale photovoltaic generation device 21E is controlled by the voltage control inverter 11E. The voltage control inverter 11E is controlled by a command value of the energy management system 100. The large scale photovoltaic generation device 21E may include a storage battery configured to store photovoltaically generated power. The voltage control inverter 11E operates like a voltage source, and converts DC power input from the large scale photovoltaic generation device 21E into AC power to be output to the transmission and distribution line 4 side.

Power devices of a type other than the power devices 31A to 31E may be provided. For example, power devices including a wind power generation device may be provided.

The synchronous generator (power device) 31A and the power device 31B to 31E (more specifically, the voltage control inverters 11B to 11E) include a capability of stabilizing a frequency when a frequency of the power system 2 fluctuates or include a frequency control function. Hereinafter, this frequency control function will be described.

The synchronous generator 31A includes inertia, droop control (governor free), LFC (load frequency control), and ELD (economic load dispatching). The droop control (governor free) corresponds to Frequency Containment Reserves (first regulating force), and the LFC corresponds to Frequency Restoration Reserves (second regulating force), and the ELD corresponds to Replacement Reserve (third regulating force). The LFC and the ELD are performed by generating and outputting power (active power and reactive power) in accordance with the command information of the energy management system 100.

The inertia is inertia force that a rotator (such as a turbine or a motor) or the like of the power generation device has, and is force with which a difference between a total of generated power and a total of power consumption is absorbed through acceleration or deceleration of the rotator (by increasing or decreasing an amount of generated power). An operation based on this inertia is also referred to as an inertial response. With regard to a periodic fluctuation of approximately less than several seconds, the frequency control is performed by the inertia.

With regard to a frequency fluctuation with a period of approximately several seconds to several minutes, the frequency control is performed by the droop control (governor free) corresponding to the Frequency Containment Reserves. The droop control is performed by a governor of the synchronous power generation device 31A. When a magnitude of load connected to the power system 2 fluctuates, a rotation speed of the rotator changes, and a frequency of the generator changes from a reference frequency. Control with which a rotation is controlled to suppress this frequency change and a power generation output is increased or decreased is the droop control. The droop control can deal with a load fluctuation or imbalance between the supply and the demand which is difficult for the LFC and the ELD to follow.

With regard to a frequency fluctuation with a period of approximately several minutes to several tens of minutes, the frequency control is performed by the LFC (load frequency control) corresponding to the Frequency Restoration Reserves. To keep a system frequency constant (reference frequency), the energy management system 100 performs control by calculating a power generation output for cancelling, from a frequency deviation of the power system 2 or the like, the deviation, and supplying an output command of the calculated power to the synchronous generator 31A.

With regard to a frequency fluctuation with such a period beyond several tens of minutes, the frequency control is performed by the ELD (economic load dispatching) corresponding to the Replacement Reserve. To deal with a load fluctuation for a relatively long period of time (period of approximately several tens of minutes to several hours), the energy management system 100 performs control by calculating an advance power generation output in conformity to a demand prediction and providing the output command of the calculated power to the synchronous generator 31A.

The voltage control inverters 11B to 11E include simulated inertia, the droop control (governor free), the LFC (load frequency control), and the ELD (economic load dispatching). The droop control (governor free) corresponds to the Frequency Containment Reserves, the LFC corresponds to the Frequency Restoration Reserves, and the ELD corresponds to the Replacement Reserve. The LFC and the ELD are performed by generating and outputting power (active power and reactive power) in accordance with a command of the energy management system 100.

The pseudo inertia is a control scheme for causing the power generation device and the power storage device which do not provide the inertia to perform such a same operation as the inertia that has the synchronous power generation device through intelligent control. The pseudo inertia is achieved by using a known mechanism. The droop control of the voltage control inverters 11B to 11E is achieved by simulating an operation similar to the droop control of the synchronous power generation device by intelligent control. The LFC and the ELD are similar to those of the synchronous power generation device 31A.

A magnitude or a degree of an inertial response of the synchronous generator 31A can be regulated by an inertia constant (inertia force constant) that is a control parameter. As the inertia constant is further increased, change of the power generation output by the inertial response is also further increased. A magnitude or a degree of an inertial response (simulated inertial response) of the voltage control inverters 11B to 11E which have pseudo inertia can also be regulated by a constant value that is a control parameter. This constant in a case of the simulated inertia is also referred to as an inertia constant.

A magnitude or a degree of the droop control of the synchronous generator 31A, that is, the Frequency Containment Reserves can be regulated by a value of a speed mediation rate (droop rate) that is a control parameter. The speed mediation rate is a ratio of a "change in a rotation speed" to a "change in an output" when the output of the power generation device during operation at a certain output is changed, and may also be referred to as a Frequency Containment Reserves constant (Frequency Containment Reserves constant). As the droop rate is further increased, output power (output active power) to the power system 2 is further increased. For droop characteristics of the voltage control inverters 11B to 11E which simulate a droop characteristic of the synchronous generator, a parameter equivalent to the speed mediation rate (droop rate) is also used, and the magnitude or the degree of the droop control can be regulated by this parameter. This parameter is also referred to as a speed mediation rate (droop rate).

The control parameter is not limited to the inertia constant and the droop rate which have been described above but may be parameters of other types as long as the control parameter is related to input and output of power by the power device to the power system 2.

A magnitude of the Frequency Restoration Reserves (LFC) or a magnitude of the Replacement Reserve (ELD) are regulated when the energy management system 100 controls magnitudes of the active power and the reactive power which the power devices 31A to 31E are commanded to follow based on the frequency deviation of the system, the demand prediction, or the like. That is, the Frequency Restoration Reserves control and the Replacement Reserve control are performed through general control on the active power and the reactive power.

The energy management system 100 acquires, from the information communication devices 51X and 51Y, information (for example, total power consumption in the demand areas or information of the representative location) in each of the demand areas X and Y, and also acquires, from information communication devices 51A to 51E, information of the power devices 31A to 31E. The energy management system 100 performs the frequency control for stabilizing the frequency in the power system 2 based on these acquired information.

In each of the power devices 31A to 31E, the operations based on the inertia and the droop control which have been described above are respectively individually (autonomously) performed, and also, in the energy management system 100, the Frequency Restoration Reserves control and the Replacement Reserve control are performed on each of the power devices 31A to 31E, so that even when a balance between the generated power and the power consumption of the consumers (demanded power) is changed too, the frequency control for stabilizing the frequency in the power system 2 is performed. At this time, one of features of the energy management system 100 is that regulation of the inertia constant and the speed mediation rate in each of the power devices is performed according to the distance between each of the demand areas X and Y and the placement area of each of the power devices, and also control of the Frequency Restoration Reserves and the Replacement Reserve is performed. As a result, even when the balance between the supply and the demand in the power system 2 is abruptly changed, the power transmission loss can be suppressed to a low level, and it becomes possible to perform the control on the frequency stabilization.

Figure 2:
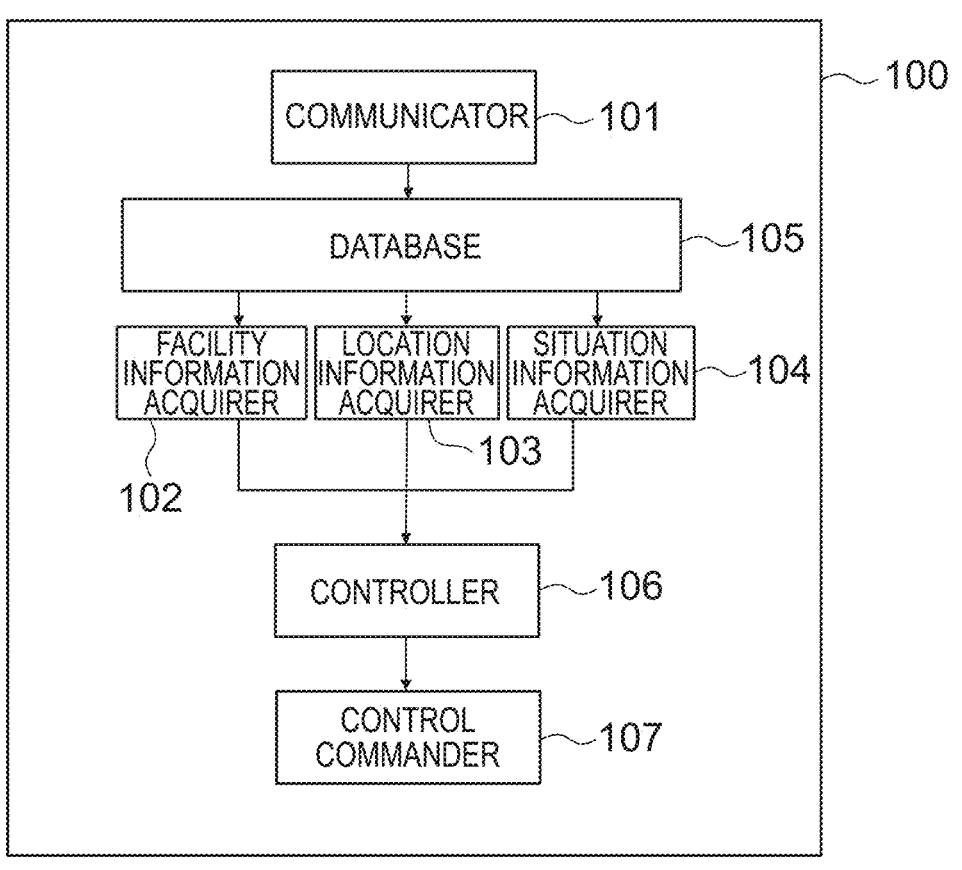
FIG. 2 is a block diagram illustrating an example of an energy management system.
Figure 3:
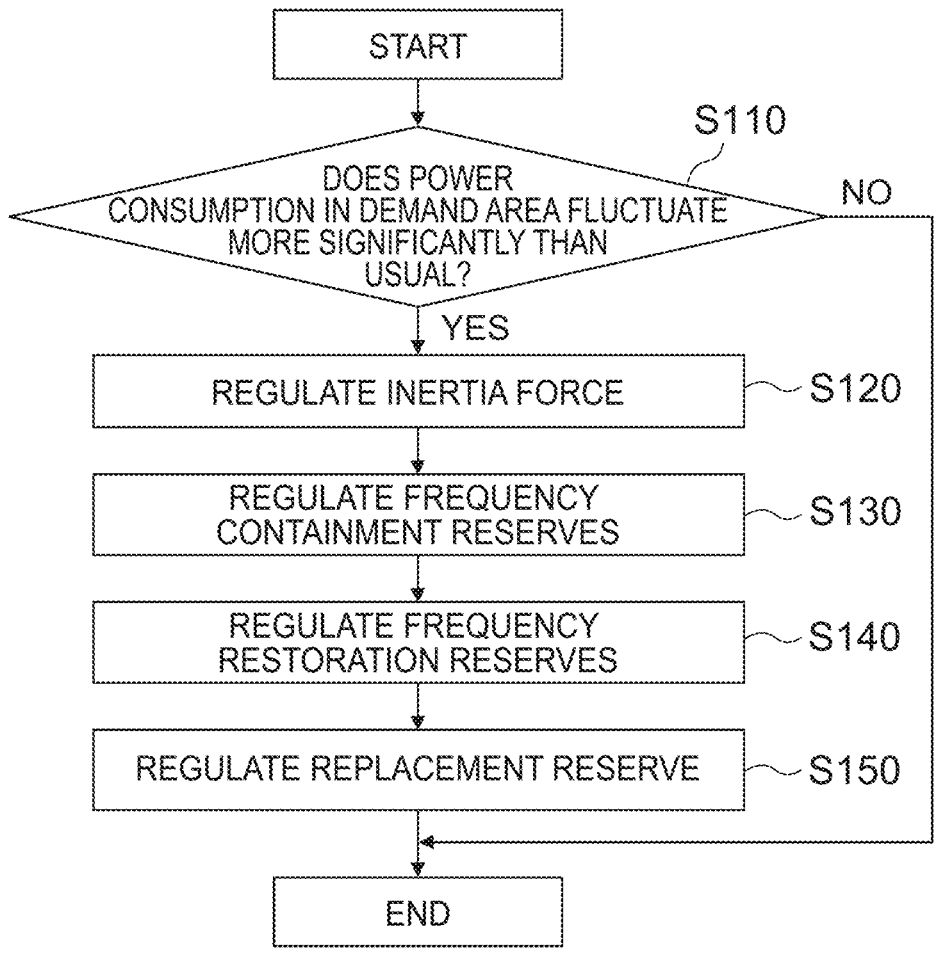
FIG. 3 is a flowchart of an example of processing by a controller.

FIG. 2 is a block diagram illustrating an example of the energy management system 100. The energy management system 100 includes a communicator 101, a facility information acquirer 102, a location information acquirer 103, a situation information acquirer 104, a database 105, a controller 106, and a control commander 107. The controller 106 includes a main function corresponding to a control device according to the present embodiment. The control device according to the present embodiment may further include at least one or all of functions of the function devices 101 to 105 and 107 in addition to the controller 106. The facility information acquirer 102, the location information acquirer 103, and the situation information acquirer 104 are examples of an acquirer configured to acquire information.

The communicator 101 communicates with the information communication devices 51X and 51Y corresponding to the demand areas X and Y in a wireless or wired manner. In addition, the communicator 101 communicates with the information communication devices 41A to 41E corresponding to the power devices 31A to 31E in a wireless or wired manner. For the communication, a communication path (link) may be regularly connected. Each time the communication is performed, a communication path may be established, and after the communication is ended, the communication path may be disconnected. A scheme for the communication may be a dedicated protocol, or may be a general protocol.

The database 105 stores therein information acquired by the communicator 101. A location of the storage may be determined in advance according to a type of the acquired information.

Examples of the information acquired from the information communication devices 41A to 41E on the power devices 31A to 31E side include facility information and situation information of the power devices 31A to 31E and information of the areas A to E where the power devices 31A to 31E are placed.

Examples of the facility information of the power devices 31A to 31E include specification information of the power devices 31A to 31E. When the power device includes a power generation device, the facility information may include output power (generation capacity) (KW). When the power device includes a power storage device (including a case of an EV), the facility information may include at least one of SOC (state of charge) and output power (KW). Herein, the SOC represents a ratio of a remaining power amount of the power storage device. In addition, when the power device includes the power storage device, the facility information may include information of inertial energy. The inertial energy is a value obtained by multiplying the inertia constant of the power device during operation by output power (KW) of the power storage device, and is information held by the power device. A frequency for acquiring information from the information communication devices 41A to 41E may be every certain period of time, or may be any timing. Example of any timing include timing instructed from the controller 106, timing at which a predetermined time has arrived, or the like. The frequency for acquiring information may be different depending on a type of the information.

Examples of the situation information of the power devices 31A to 31E include, for example, the control parameters of the power devices 31A to 31E (the inertia constant, and the Frequency Containment Reserves constant (droop rate)). In addition, the examples include information of current output power of the power devices 31A to 31E. In addition, the examples include information of a control command (host control command) received and executed by the power devices 31A to 31E from the energy management system 100. The control command may be a currently executed control command, or may be information of a control command which is executed or received during a certain period. Note that the energy management system 100 may manage a history of control commands issued to the power devices 31A to 31E by its own system.

Examples of the information of the areas A to E include location information of the areas A to E. This location information may be location information of the power devices 31A to 31E. When the power devices 31A to 31E are provided with GPS, detected location information of the GPS may be used. The location information may be a representative location of the areas A to E. The location information may be coordinates represented by a longitude, a latitude, an altitude, and the like, or may be an address, or an area name. In the case of the area name, the energy management system 100 (the location information acquirer 103 or the controller 106) may identify the location of the placement area from a name by using map data. In addition, the information of the placement area may include information indicating a distance to another placement area. Each of the power devices may store information of a distance of another power device to the placement area. Note that a distance between the placement areas may be calculated by the energy management system 100 (the location information acquirer 103 or the controller 106) from the location information of each of the placement areas.

Information acquired from the information communication devices 51X and 51Y on the demand areas X and Y side includes location information and power consumption information in each of the demand areas X and Y.

The location information of the demand areas may be a representative location of the demand areas, or a demand area name. In a case of the demand area name, the energy management system 100 (the location information acquirer 103 or the controller 106) may identify the location information of the demand areas from the name by using the map data. In addition, the location information of the demand areas may include the demand area, the placement area of each of the power devices 31A to 31E, and information indicating a distance. The energy management system 100 (the location information acquirer 103 or the controller 106) may calculate a distance between the demand area and each of the placement areas from a distance between the location of the demand area and the location of each of the placement areas. Instead of the acquisition of the power consumption information in the demand area, the power consumption information in the demand area may be calculated by acquiring the information of the power consumption of each of the load devices in the demand area and adding these power consumption by the energy management system 100.

The facility information acquirer 102 acquires the facility information of the power devices 31A to 31E from the database 105 to be transmitted to the controller.

The location information acquirer 103 acquires placement area information of the power devices 31A to 31E, and location information of the demand areas X and Y from the database 105 to be transmitted to the controller 106. At this time, distance information indicating distances between the demand areas X and Y and the areas A to E may also be transmitted.

The situation information acquirer 104 acquires the situation information of the power devices 31A to 31E from the database 105 to be transmitted to the controller 106.

The controller 106 may transmit an acquisition request of information from the facility information acquirer 102, the location information acquirer 103, and the situation information acquirer 104 every certain period of time to acquire the information.

The controller 106 controls operations of the power device 31A to 35E based on the information acquired from the facility information acquirer 102, the location information acquirer 103, and the situation information acquirer 104. Specifically, control of the inertia force (control of the inertia constant), control of the Frequency Containment Reserves (control of a first regulating constant (Frequency Containment Reserves constant) or the droop rate), control of the Frequency Restoration Reserves (control of the active or reactive power), and control of the Replacement Reserve (control of the active or reactive power) in the power device 31A to 35E are performed. The control commander 107 transmits the control command according to content determined by the controller 106 to the power device 31A to 35E. The power device 31A to 35E perform charge and discharge control according to this control command.

Figure 4:
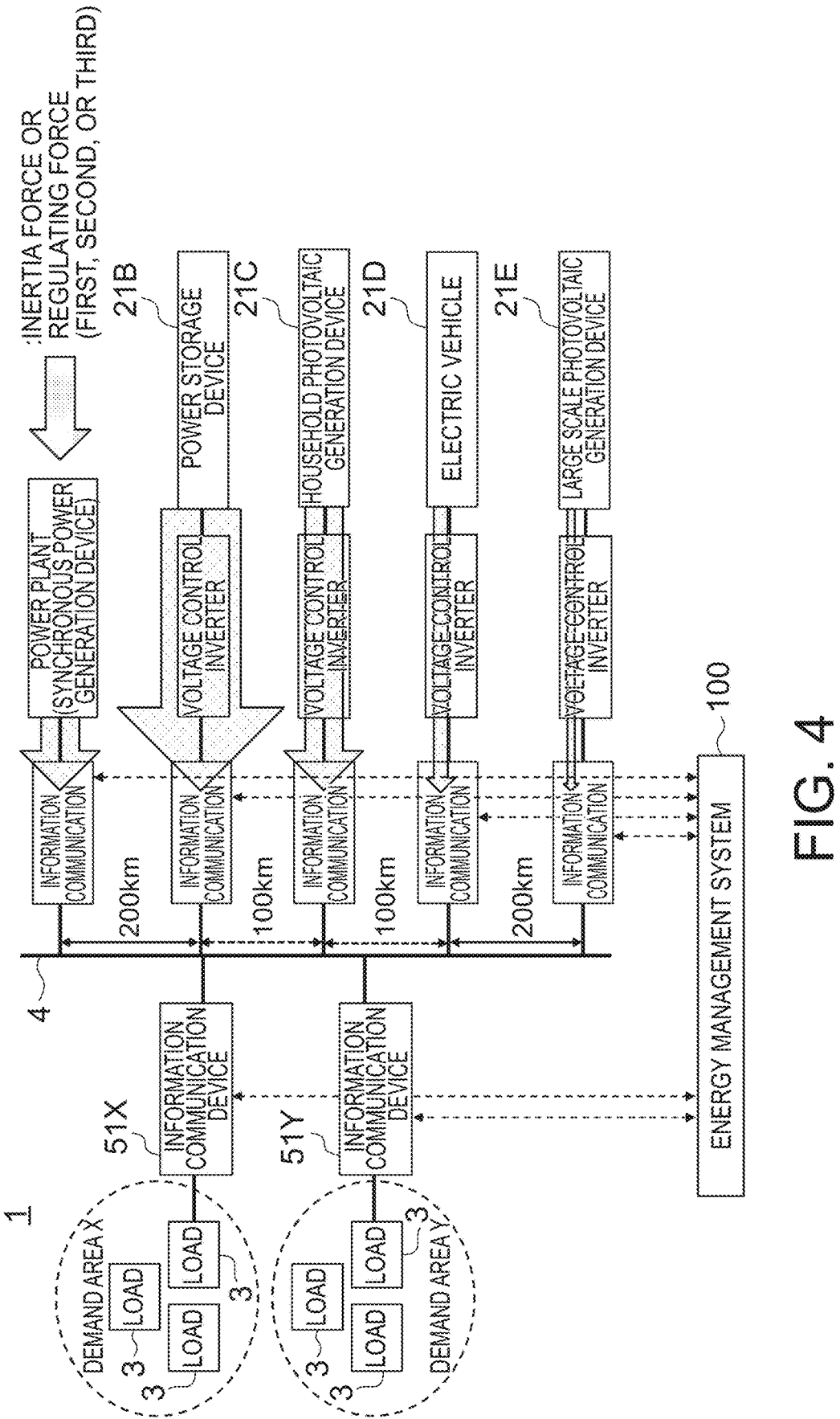
FIG. 4 illustrates an example in which inertia force and regulating force are controlled according to the distance from each of power devices to a load fluctuation area.
Figure 5:
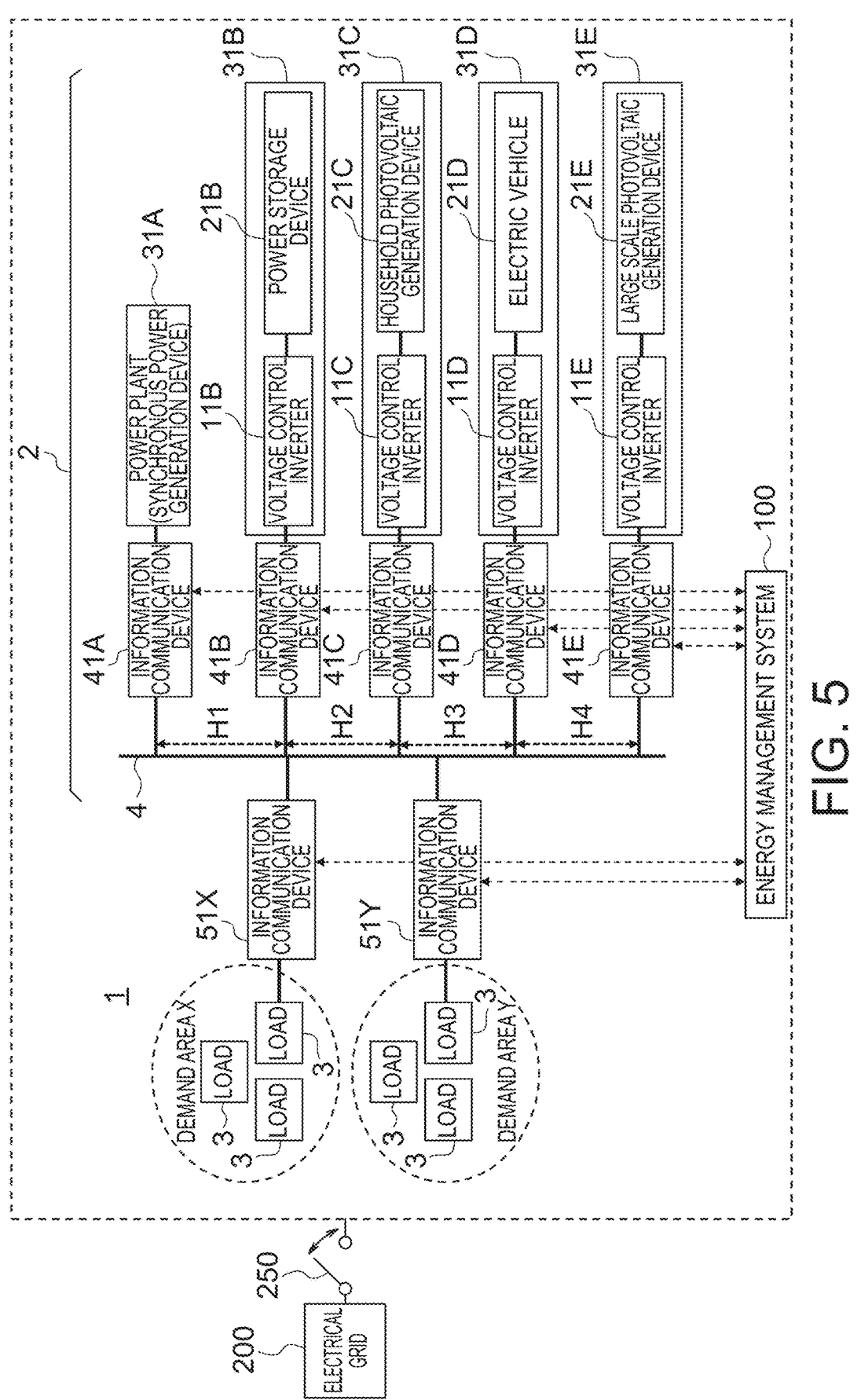
FIG. 5 illustrates a configuration example in which a power system is a microgrid.

FIG. 4 is a flowchart of an example of processing by the controller 106. The controller 106 performs this processing every certain period of time, for example.

It is determined whether or not power consumption in each of the demand areas (the demand areas X and Y) fluctuates more significantly than usual (S110). Herein, it is determined whether or not the power consumption fluctuates (increases or decreases) at a certain amount or more per unit time (S110). When the power consumption fluctuates at the certain amount or more, a distance between a demand area (which is referred to as a load fluctuation area) in which the fluctuation occurs and the areas A to E where the power devices 31A to 31E are placed is identified. The distance may be calculated from the location information of the load fluctuation area and the location information of each of the placement areas, or information of the distance may be stored in the database 105 of the energy management system 100 in advance. Herein, a case will be assumed where a consumer area X is the load fluctuation area.

With regard to the power devices 31A to 31E, for the power devices with the respective placement areas being closer to the load fluctuation area, the inertia force (also including the pseudo inertia force) is regulated to be further increased (S120). That is, control for increasing the inertia constant is performed. When the load fluctuation area is the demand area X, the distances to the demand area X are closer in the stated order of the areas B, the areas C, the areas A and D, and the areas E described above. In this case, when the power devices 31A to 31E are set to respectively have inertia constants VA to VE, VB is the largest, VC is the second largest, VA and VD are the third largest, and VE is the smallest. Specifically, as a method of determining the respective values, correspondence information (a table or a function) in which a variation amount of the power consumption in the demand area, a distance between the load fluctuation area and the placement area, and a value of the inertia constant are associated with each other may be stored in the database 105 or another storage, and the respective values may be determined based on this correspondence information. The correspondence information may be in any format such as the table or the function.

Herein, the inertia constant is determined according to the distance alone, but by taking into account a situation of the individual power device as a further condition, the inertia constant may be determined.

For example, when the power device includes a power generation device (in FIG. 1, in a case of the power devices 31A, 31C, and 31E), as the generation capacity is larger, the inertia constant may be increased. As a result, the power loss of the transmission and distribution of power can be reduced, and safety of the power generation device can also be improved. The generation capacity is a numeric value (kw) representing how much the power generation device can generate power, and is also referred to as an output capacity. When the generation capacity of the power device is large, even in a case where the amount of power consumption abruptly increases by that much, the power generation device has a margin or an ability with which the fluctuation of the inertia force can be dealt with. Specifically, as a method of reflecting the generation capacity on the fluctuation amount of the inertia constant, the generation capacity may be added to the above described correspondence information. In this case, the distance of the power generation device to the placement area and the fluctuation amount of the inertia constant corresponding to the generation capacity of the power generation device may be acquired from the above described correspondence information.

In addition, when the power device includes the power storage device, according to the SOC (state of charge) of the power storage device, the inertia constant may be increased. For example, when the power consumption in the demand area abruptly increases, it may be mentioned that as the SOC is larger, the margin or the ability with which the fluctuation of the inertia force can be dealt with is prepared. Therefore, as the SOC is larger, the inertia constant may be further increased. Note that the power storage device may be obtained by being combined with a household photovoltaic generation device or a large scale photovoltaic power generation device to store power generated by the photovoltaic power generation device (the same applies hereinafter).

In addition, when the power device includes a power storage device, the inertia constant may be increased according to the inertial energy hold by the power device. For example, when the power consumption in the demand area abruptly increases, since the margin or the ability with which the fluctuation of the inertia force can be dealt with is prepared as the inertial energy is larger, the inertia constant may be further increased as the inertial energy is larger.

The control commander 107 transmits the command information of the inertia constant which is determined by the controller 106 for the power devices 31A to 31E to each of the power devices 31A to 31E. The command information may be a value of the inertia constant after the change, or may be a fluctuation amount from the value of the current inertia constant in each of the power devices.

FIG. 4 illustrates an example in which the inertia force is regulated according to the distance from each of the power devices 31A to 31E to the load fluctuation area (in this example, the demand area X). A magnitude of the inertia constant is schematically illustrated by a thickness of an arrow. Herein, a case will be assumed where the inertia constant is increased by an amount according to the thickness of the arrow.

The change of the inertia force is effective to the regulation within several seconds after occurrence of fluctuation in a demand amount (power consumption in the demand area). With regard to the frequency fluctuation with a period from approximately several seconds to several minutes, the frequency control is performed through the regulation of the Frequency Containment Reserves. In view of the above, the controller 106 performs control for regulating the inertia force of the power devices 31A to 31E, and then performs control for regulating the Frequency Containment Reserves (S130). The regulation of the Frequency Containment Reserves means that the droop rate (the Frequency Containment Reserves constant) is regulated. The regulation of the Frequency Containment Reserves may be performed according to the distance between the load fluctuation area and each of the placement areas similarly as in the regulation of the inertia force.

That is, with regard to the power devices 31A to 31E, for the power devices with the respective placement areas being closer to the load fluctuation area, such control is performed that the Frequency Containment Reserves is further increased, that is, the droop rate (the Frequency Containment Reserves constant) is further increased. When the load fluctuation area is the demand area X, the distances to the demand area X are closer in the stated order of the areas B, the areas C, the areas A and D, and the areas E described above. In this case, when the Frequency Containment Reserves constants of the power devices 31A to 31E are respectively set as WA to WE, WB is the largest, WC is the second largest, WA and WD are the third largest, and WE is the smallest. Specifically, as a method of determining the fluctuation amount, correspondence information in which the fluctuation amount of the total power consumption, a distance between the load fluctuation area and the placement area, and the Frequency Containment Reserves constant are associated with each other may be stored in the database 105 or another storage, and the fluctuation amount may be determined based on this correspondence information. The correspondence information may be a table or a function. The control commander 107 transmits the command information of the Frequency Containment Reserves constant determined by the controller 106 for the power device 31 to 31E to each of the power devices 31A to 31E. The command information may be a value of the Frequency Containment Reserves constant after the change, or may be a fluctuation amount from the value of the current Frequency Containment Reserves constant in each of the power devices.

Herein, the Frequency Containment Reserves constant is determined according to the distance alone, but similarly as in the case of the regulation of the inertia force, the Frequency Containment Reserves constant may be determined by further including the situation of the individual power device as the condition.

For example, when the power device includes a power generation device (in FIG. 1, in a case of the power devices 31A, 31C, and 31E), as the generation capacity is larger, the Frequency Containment Reserves constant may be further increased. As the generation capacity of the power generation device is larger, even when the amount of power consumption abruptly increases by that much, the power generation device has a margin or an ability with which the fluctuation of the Frequency Containment Reserves can be dealt with. Specifically, as a method of reflecting the generation capacity on the value of the Frequency Containment Reserves constant, the generation capacity may be added to the above described correspondence information. In this case, the value of the Frequency Containment Reserves constant corresponding to the distance of the power generation device to the placement area and the generation capacity of the power generation device may be acquired from the above described correspondence information.

In addition, when the power device includes the power storage device, according to the SOC (state of charge) of the power storage device, the Frequency Containment Reserves constant may be further increased. For example, when the total power consumption abruptly increases, it may be mentioned that the margin or the ability with which the fluctuation of the Frequency Containment Reserves can be dealt with is prepared, as the SOC is larger. Therefore, as the SOC is larger, the Frequency Containment Reserves constant may be further increased.

In addition, when the power device includes a power storage device, according to the inertial energy held by the power device, the Frequency Containment Reserves constant may be further increased. For example, when the total power consumption abruptly increases, as the inertial energy is larger, it may be mentioned that a margin or an ability with which the situation of the inertial energy can be dealt with is prepared, as the inertial energy is larger, the Frequency Containment Reserves constant may be further increased.

The control commander 107 transmits the command information of the Frequency Containment Reserves constant which is determined by the controller 106 for the power device 31 to 31E to each of the power devices 31A to 31E. The command information may be the value of the Frequency Containment Reserves constant after the change or may be the fluctuation amount from the value of the current Frequency Containment Reserves constant in each of the power devices.

FIG. 4 described above illustrates an example in which the Frequency Containment Reserves of the power devices 31A to 31E is regulated according to a distance from each of the power devices 31A to 31E to the load fluctuation area (in this example, the demand area X). A magnitude of the Frequency Containment Reserves of the power devices 31A to 31E is schematically illustrated by a thickness of an arrow. Herein, a case will be assumed where the first regulating constant is increased by an amount according to the thickness of the arrow.

The controller 106 performs control for regulating the Frequency Containment Reserves of the power devices 31A to 31E, and then performs control for regulating the Frequency Restoration Reserves (S140). With regard to the frequency fluctuation with a period of approximately several minutes to several tens of minutes, the frequency control is performed through the regulation of the Frequency Restoration Reserves (LFC: load frequency control). The regulation of the Frequency Restoration Reserves is performed through general control of the active power and the reactive power. The regulation of the Frequency Restoration Reserves may also be performed according to the distance between the load fluctuation area and each of the placement areas similarly as in the regulation of the inertia force and the regulation of the Frequency Containment Reserves. The regulation of the Frequency Restoration Reserves may be performed by using a history of host command values (command values of the active power or the reactive power to be output) so far for the power devices 31A to 31E.

For example, when the power consumption in the demand area significantly increases, with regard to the power devices 31A to 31E, the active power is more significantly changed for the power devices with the respective placement areas being closer to the load fluctuation area. Similarly as in the case of the regulation of the inertia force and the regulation of the Frequency Containment Reserves, as the condition other than the distance, the Frequency Restoration Reserves may be regulated by further including the situation of the individual power device (the generation capacity, the SOC, the inertial energy, or the like) as the condition. A method for the regulation may be similar to cases of the regulation of the inertia force and the regulation of the Frequency Containment Reserves.

The control commander 107 transmits the command information (identification of the active power or the reactive power to be output) of the Frequency Restoration Reserves determined by the controller 106 for the power device 31 to 31E to each of the power devices 31A to 31E.

FIG. 4 described above illustrates an example in which the Frequency Restoration Reserves of the power devices 31A to 31E is regulated according to a distance from each of the power devices 31A to 31E to the load fluctuation area (in this example, the demand area X). A magnitude of the Frequency Restoration Reserves of the power devices 31A to 31E is schematically illustrated by a thickness of an arrow. Herein, a case will be assumed where the active power is increased by an amount according to the thickness of the arrow.

The controller 106 performs control for regulating the Frequency Restoration Reserves of the power devices 31A to 31E, and then performs control for regulating the Replacement Reserve (S150). With regard to a frequency fluctuation with such a period beyond several tens of minutes, the frequency control is performed through the regulation of the Replacement Reserve (ELD: economic load dispatching). The regulation of the Replacement Reserve is performed through general control of the active power and the reactive power. The regulation of the Replacement Reserve may also be performed according to the distance between the load fluctuation area and each of the placement areas similarly as in the regulation of the inertia force and the regulation of the Frequency Containment Reserves. The regulation of the Replacement Reserve may be performed by using a history of host command values (command values of the active power or the reactive power to be output) so far for the power devices 31A to 31E.

For example, when the power consumption in the demand area significantly increases, with regard to the power devices 31A to 31E, for the power devices with the respective placement areas being closer to the load fluctuation area, the active power is more significantly changed. Similarly as in the case of the regulation of the inertia force and the regulation of the Frequency Containment Reserves, as the condition other than the distance, the Frequency Restoration Reserves may be regulated by further including the situation of the individual power device (the generation capacity, the SOC, the inertial energy, or the like) as the condition. A method for the regulation may be similar to cases of the regulation of the inertia force and the regulation of the Frequency Containment Reserves.

The control commander 107 transmits the command information (identification of the active power or the reactive power to be output) of the Replacement Reserve determined by the controller 106 for the power device 31 to 31E to each of the power devices 31A to 31E.

FIG. 4 described above illustrates an example in which the Replacement Reserve of the power devices 31A to 31E is regulated according to a distance from each of the power devices 31A to 31E to the load fluctuation area (in this example, the demand area X). A magnitude of the Replacement Reserve of the power devices 31A to 31E is schematically illustrated by a thickness of an arrow. Herein, a case will be assumed where the active power is increased by an amount according to the thickness of the arrow.

The processing of the present flowchart may be repeatedly executed every certain period of time. In step S110, a fluctuation of power consumption in a load fluctuation region is settled down (for example, for a certain period of time, the fluctuation amount of the power consumption is less than or equal to a threshold), the controller 106 may perform control for restoring the inertia force and the regulating force (Frequency Containment Reserves, Frequency Restoration Reserves or Replacement Reserve) to the original values. An order of the restoration may be determined in advance.

The processing of the present flowchart can be achieved by a computer program. In this case, the computer program may be stored in a storage medium such as a memory, and a computer may be caused to read the computer program from a recording medium. The computer may be a general arithmetic device including a CPU, a memory, and an input and output circuit.

As described above, according to the present embodiment, as the distance between the load fluctuation area and the placement area of each of the power devices is closer, the inertia force and the regulating force (Frequency Containment Reserves, Frequency Restoration Reserves or Replacement Reserve) of the power device is more significantly controlled, so that instead of the increase in the inertia force and the regulating force of the power device in the far placement area, the power transmission loss is reduced as a whole, and the frequency control of the power system can be performed.

Modification

According to the above described embodiment, as the distance between the load fluctuation area and the placement area of each of the power devices is closer, the inertia force and the regulating force (Frequency Containment Reserves, Frequency Restoration Reserves or Replacement Reserve) of each of the power devices are regulated to be further increased. However, the inertia force and the regulating force of each of the power devices may be regulated such that as the distance is closer, a regulated amount from a current value is further increased. For example, as the distance is closer, a regulated amount of the inertia constant may be further increased. As a result, instead of the increase in the regulated amount of the inertia constant of the far power device, the power transmission loss is reduced as a whole, and the frequency control of the power system can be performed.

Second Embodiment

In the configuration of FIG. 1, a case has been assumed where the power system 2 is the backbone system, but according to a second embodiment, the power system 2 is a microgrid.

FIG. 4 illustrates a configuration example in which the power system 2 is the microgrid. The microgrid is connected to an electrical grid 200 via a switch 250. The microgrid is part of the power system 2, and serves as a small scale power system placed in a region. The communicator 101 of the energy management system 100 communicates with the switch 250, and can acquire information indicating a closed or opened state of the switch 250. For example, information of being closed or opened may be acquired at certain time intervals, or information may be acquired when the switch changes from opened to closed, or the switch changes from closed to opened. Alternatively, the information of being closed or opened may be acquired from other devices such as the information communication devices 51X and 51Y and 41A to 41E.

The switch 250 is closed (the switch 250 is on) during normal times, and power supply is also performed from the backbone system 200 to the microgrid. When an abnormality such as blackout or a disaster occurs in the backbone system 200, the switch 250 is opened (the switch 250 turns off), and the microgrid is separated from the backbone system 200 to operate alone. That is, the microgrid alone provides power in the region. The microgrid disconnected from the backbone system 200 is referred to as an off-the-grid, and the microgrid connected to the backbone system 200 is referred to as an on-the-grid. In the off-the-grid too, in response to a generation of the load fluctuation area in the demand area, the energy management system 100 controls the inertia force and the regulating force (Frequency Containment Reserves, Frequency Restoration Reserves or Replacement Reserve) of each of the power devices through an operation similar to the operation in a case of the configuration in FIG. 1.

Herein, a method for the energy management system 100 to control the inertia force and the regulating force of each of the power devices may be changed according to whether the grid is the off-the-grid or the on-the-grid. In a case of the on-the-grid, the operation of the embodiment described above is performed. In a case of the off-the-grid, power supply of the entire power capacity from the backbone system 200 is not performed. Since the power capacity becomes less than the power capacity of the on-the-grid, values or change widths of the inertia force and the regulating force (Frequency Containment Reserves, Frequency Restoration Reserves or Replacement Reserve) may be decreased. Thus, the correspondence information described above may be separately prepared for the off-the-grid and the on-the-grid to be used according to whether the grid is the off-the-grid or the on-the-grid.

By determining whether the grid is the off-the-grid or the on-the-grid, it is possible to set an optimal inertia constant and regulating force for each of the on-the-grid and the off-the-grid. That is, when the microgrid is separated from the backbone system during power outage, a disaster, or the like, depending on an actual environment of the microgrid, the appropriate inertia constant or regulating force be determined. When the so-called local generation for local use is performed too, the power loss of the transmission and distribution of the power can be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The embodiments as described before may be configured as below.

Clauses

Clause 1. A control device for an electric power system capable of supplying power to load devices in a plurality of demand areas based on first to N-th power devices in first to N-th placement areas and configured to be able to perform at least one of discharge or charge of power, comprising:
a controller configured to
detect, based on information of power consumption in each of the demand areas, a demand area in which the power consumption fluctuates more significantly than usual, and
determine, according to distances between a detected demand area and the first to N-th placement areas, a control parameter related to input and output of power in the first to N-th power devices.

Clause 2. The control device according to clause 1, wherein
the first to N-th power devices have inertia force for the electric power system, and
the control parameter is an inertia constant.

Clause 3. The control device according to clause 2, wherein
the controller further increases the inertia constant of the power device in the placement area as the distance of the placement area to the detected demand area is closer.

Clause 4. The control device according to clause 1 or 2, wherein
the first to N-th power devices are able to perform droop control for the electric power system, and
the control parameter is a droop rate.

Clause 5. The control device according to clause 4, wherein
the controller further increases the droop rate of the power device in the placement area as the distance of the placement area to the detected demand area is closer.

Clause 6. The control device according to any one of clauses 1 to 5, wherein
the controller performs control for regulating Frequency Restoration Reserves of the first to N-th power devices according to the distances between the detected demand area and the first to N-th areas.

Clause 7. The control device according to any one of clauses 1 to 6, wherein
the controller performs control for regulating Replacement Reserve of the first to N-th power devices according to the distances between the detected demand area and the first to N-th placement areas.

Clause 8. The control device according to any one of clauses 1 to 7, wherein
at least one of the first to N-th power devices includes a power generation device, and
the controller changes the control parameter of the power device that includes the power generation device further based on a generation capacity of the power generation device.

Clause 9. The control device according to any one of clauses 1 to 8, wherein
at least one of the first to N-th power devices includes a power storage device, and
the controller changes the control parameter of the power device that includes the power storage device further based on a state of charge of the power storage device.

Clause 10. The control device according to clause 9, wherein
the at least one power device further includes a power generation device, and the power storage device is configured to store power generated by the power generation device.

Clause 11. The control device according to any one of clauses 1 to 10, wherein
the electric power system is connected to an electrical grid via a switch, and
the controller changes the control parameter further based on opened/closed state information indicating whether or not the switch is opened.

Clause 12. The control device according to any one of clauses 1 to 11, wherein
the first to N-th power devices include a synchronous generator or a constant voltage inverter, and the synchronous generator or the constant voltage inverter has the inertia force for the electric power system.

Clause 13. The control device according to any one of clauses 1 to 11, wherein
the first to N-th power devices include a synchronous generator or a constant voltage inverter, and the synchronous generator or the constant voltage inverter has a function of performing the droop control.

Clause 14. The control device according to any one of clauses 1 to 13, wherein
the distances between the detected demand area and the first to N-th placement areas is a distance along a power line in the power system.

Clause 15. The control device according to any one of clauses 1 to 14, wherein
the distances between the detected demand area and the first to N-th placement areas is a geographical distance.

Clause 16. The control device according to any one of clauses 1 to 15, wherein
the power consumption in each of the demand areas is a total of power consumption of the load devices in each of the demand areas.

Clause 17. An energy management system for an electric power system capable of supplying power to load devices in a plurality of demand areas based on first to N-th power devices in first to N-th placement areas and configured to be able to perform at least one of discharge or charge of power, comprising:
a communicator configured to communicate with a plurality of information communication devices corresponding to the plurality of demand areas;
an acquirer configured to acquire information of power consumption in each of the demand areas from the plurality of information communication devices;
a controller configured to
detect, based on the information of the power consumption in each of the demand areas, a demand area in which the power consumption fluctuates more significantly than usual, and
determine, according to distances between a detected demand area and the first to N-th placement areas, a control parameter related to input and output of power in the first to N-th power devices; and
a control commander configured to transmit command information to the first to nth power devices to instruct them to perform power input/output based on the control parameters.

Clause 18. A non-transitory computer readable medium having a computer program stored therein which causes a computer to perform processes, the computer being for an electric power system capable of supplying power to load devices in a plurality of demand areas based on first to N-th power devices in first to N-th placement areas and configured to be able to perform at least one of discharge or charge of power, the processes comprising:
acquiring information of power consumption in each of the demand areas;
detecting, based on the information of the power consumption in each of the demand areas, a demand area in which the power consumption fluctuates more significantly than usual;
determining, according to distances between a detected demand area and the first to N-th placement areas, a control parameter related to input and output of power in the first to N-th power devices; and transmitting command information to the first to nth power devices to instruct to perform power input/output based on the control parameter.

The invention claimed is:
1. A control device for an electric power system capable of supplying power to load devices in a plurality of demand areas based on first to N-th power devices in first to N-th placement areas, where N is an integer of 3 or more, and configured to be able to perform at least one of discharge or charge of power, the control device comprising:
a controller configured to:
detect, based on information of power consumption in each of the demand areas, a demand area in which the power consumption fluctuates more significantly than usual; and
determine, according to distances between a detected demand area and the first to N-th placement areas, a control parameter related to input and output of power in the first to N-th power devices,
wherein the control parameter is at least one of:
(i) an inertia constant such that the inertia constant of a power device in a placement area closer to the detected demand area is increased,
(ii) a droop rate such that the droop rate of a power device in a placement area closer to the detected demand area is increased,
(iii) a control amount of Frequency Restoration Reserves such that the control amount of a power device in a placement area closer to the detected demand area is increased, or
(iv) a control amount of Replacement Reserve such that the control amount of a power device in a placement area closer to the detected demand area is increased.

2. The control device according to claim 1, wherein the controller, in regulating Frequency Restoration Reserves of the first to N-th power devices according to the distances between the detected demand area and the first to N-th areas, increases the control amount as at least one of a generation capacity of a power generation device included in the power device, a state of charge of a power storage device included in the power device, or inertial energy held by the power device becomes larger.

3. The control device according to claim 1, wherein the controller, in regulating Replacement Reserve of the first to N-th power devices according to the distances between the detected demand area and the first to N-th placement areas, increases the control amount as at least one of a generation capacity of a power generation device included in the power device, a state of charge of a power storage device included in the power device, or inertial energy held by the power device becomes larger.

4. The control device according to claim 1, wherein:
at least one of the first to N-th power devices includes a power generation device, and
the controller changes the control parameter of the power device that includes the power generation device further based on a generation capacity of the power generation device such that as the generation capacity is larger, the control parameter including the at least one of the inertia constant, the droop rate, the control amount of Frequency Restoration Reserves, or the control amount of Replacement Reserve is increased.

5. The control device according to claim 1, wherein:
at least one of the first to N-th power devices includes a power storage device, and
the controller changes the control parameter of the power device that includes the power storage device further based on a state of charge of the power storage device such that as the state of charge is larger, the control parameter including the at least one of the inertia constant, the droop rate, the control amount of Frequency Restoration Reserves, or the control amount of Replacement Reserve is increased.

6. The control device according to claim 5, wherein:
the at least one power device further includes a power generation device,
the power storage device is configured to store power generated by the power generation device, and
the controller changes the control parameter of the power device based on both a state of charge of the power storage device and a generation capacity of the power generation device, such that as the state of charge or the generation capacity is larger, the control parameter including the at least one of the inertia constant, the droop rate, the control amount of Frequency Restoration Reserves, or the control amount of Replacement Reserve is increased.

7. The control device according to claim 1, wherein:
the electric power system is connected to an electrical grid via a switch,
the controller changes the control parameter further based on opened/closed state information indicating whether or not the switch is opened,
in an on-grid state in which the switch is closed, the controller sets the control parameter based on first correspondence information defining a relationship between distances to the detected demand area and values of control parameters including at least one of an inertia constant, a droop rate, a control amount of Frequency Restoration Reserves, or a control amount of Replacement Reserve, and
in an off-grid state in which the switch is opened, the controller sets the control parameter based on second correspondence information in which the values or change widths of the control parameters are reduced as compared with those set based on the first correspondence information.

8. The control device according to claim 1, wherein the distances between the detected demand area and the first to N-th placement areas is a distance along a power line in the power system.

9. The control device according to claim 1, wherein the distances between the detected demand area and the first to N-th placement areas is a geographical distance.

10. The control device according to claim 1, wherein the power consumption in each of the demand areas is a total of power consumption of the load devices in each of the demand areas.

11. An energy management system for an electric power system capable of supplying power to load devices in a plurality of demand areas based on first to N-th power devices in first to N-th placement areas, where N is an integer of 3 or more, and configured to be able to perform at least one of discharge or charge of power, the system comprising:
a communicator configured to communicate with a plurality of information communication devices corresponding to the plurality of demand areas;
an acquirer configured to acquire information of power consumption in each of the demand areas from the plurality of information communication devices;

a controller configured to:
detect, based on the information of the power consumption in each of the demand areas, a demand area in which the power consumption fluctuates more significantly than usual; and
determine, according to distances between a detected demand area and the first to N-th placement areas, a control parameter related to input and output of power in the first to N-th power devices; and
a control commander configured to transmit command information to the first to N-th power devices to instruct the first to N-th power devices to perform power input/output based on the control parameter,
wherein the control parameter is at least one of:
(i) an inertia constant such that the inertia constant of a power device in a placement area closer to the detected demand area is increased,
(ii) a droop rate such that the droop rate of a power device in a placement area closer to the detected demand area is increased,
(iii) a control amount of Frequency Restoration Reserves such that the control amount of a power device in a placement area closer to the detected demand area is increased, or
(iv) a control amount of Replacement Reserve such that the control amount of a power device in a placement area closer to the detected demand area is increased.

12. A non-transitory computer readable storage medium having a computer program stored thereon, the program being executable by a computer of an electric power system which is capable of supplying power to load devices in a plurality of demand areas based on first to N-th power devices in first to N-th placement areas, where N is an integer of 3 or more, and which is configured to be able to perform at least one of discharge or charge of power, and the program being executable to control the computer to execute processes comprising:
acquiring information of power consumption in each of the demand areas;
detecting, based on the information of the power consumption in each of the demand areas, a demand area in which the power consumption fluctuates more significantly than usual;
determining, according to distances between a detected demand area and the first to N-th placement areas, a control parameter related to input and output of power in the first to N-th power devices; and
transmitting command information to the first to N-th power devices to instruct the first to N-th power devices to perform power input/output based on the control parameter,
wherein the control parameter is at least one of:
(i) an inertia constant such that the inertia constant of a power device in a placement area closer to the detected demand area is increased,
(ii) a droop rate such that the droop rate of a power device in a placement area closer to the detected demand area is increased,
(iii) a control amount of Frequency Restoration Reserves such that the control amount of a power device in a placement area closer to the detected demand area is increased, or
(iv) a control amount of Replacement Reserve such that the control amount of a power device in a placement area closer to the detected demand area is increased.

* * * * *